United States Patent
Lee (10) Patent No.: US 9,627,922 B2
(45) Date of Patent: Apr. 18, 2017

(54) ACTIVE LOAD CIRCUIT

(71) Applicants: LITE-ON ELECTRONICS (GUANGZHOU) LIMITED, Guangzhou (CN); LITE-ON TECHNOLOGY CORPORATION, Taipei (TW)

(72) Inventor: Yu-Hung Lee, Chiayi County (TW)

(73) Assignees: LITE-ON ELECTRONICS (GUANGZHOU) LIMITED, Guangzhou (CN); LITE-ON TECHNOLOGY CORPORATION, Taipei, Taiwan (TW)

( * ) Notice: Subject to any disclaimer, the term of this patent is extended or adjusted under 35 U.S.C. 154(b) by 0 days.

(21) Appl. No.: 14/983,482

(22) Filed: Dec. 29, 2015

(65) Prior Publication Data

US 2016/0218614 A1 Jul. 28, 2016

(30) Foreign Application Priority Data

Jan. 28, 2015 (CN) .......................... 2015 2 0061686

(51) Int. Cl.
*H02M 1/12* (2006.01)
*H02M 1/42* (2007.01)
*H02M 1/44* (2007.01)
*H02J 9/00* (2006.01)
*G06F 1/26* (2006.01)

(52) U.S. Cl.
CPC ................ *H02J 9/005* (2013.01); *G06F 1/26* (2013.01); *Y02B 70/126* (2013.01)

(58) Field of Classification Search
CPC ............. H02M 1/12; H02M 1/42; H02M 1/44
See application file for complete search history.

(56) References Cited

U.S. PATENT DOCUMENTS 8,217,588 B2 * 7/2012 McKinney ......... H05B 33/0815
315/119
2016/0156275 A1 * 6/2016 Ilic ..................... H05B 33/0806
315/209 R

* cited by examiner

*Primary Examiner* — Emily P Pham
(74) *Attorney, Agent, or Firm* — Li & Cai Intellectual Property (USA) Office (57) ABSTRACT

An active load circuit applicable to a power supply. The active load circuit includes a control circuit, a dummy load and an active switching circuit. The control circuit is coupled to a ground terminal, an output terminal of a power supply and the detection circuit. The dummy load is coupled to the output terminal The active switching circuit is coupled to the control circuit, the dummy load and the ground terminal. The control circuit receives an output voltage via the output terminal and receives a power-good input signal via the detection circuit. When a voltage level of the power-good input signal is lower than a threshold value, the control circuit controls the active switching circuit to enter a load-on mode so that the dummy load is connected to the ground terminal and that the output terminal is connected to the dummy load.

17 Claims, 4 Drawing Sheets

ACTIVE LOAD CIRCUIT

BACKGROUND

1. Technical Field

The present invention generally relates to an active load circuit and, more particularly, to an active load circuit capable of being automatically connected to a dummy load to prevent a power supply from being in unstable conditions when there is no load or a very light load.

2. Description of Related Art

In response to the trend of energy saving and environmental protection, the power consumption of the central processing unit in a modern computer system is getting lower. When the computer system is in an idle mode, the power consumption is approximately equal to that in a no-load state. However, when the computer system is in a no-load state, the power conversion performance of its internal power supply is unstable and this may result in malfunction of the computer system.

Figure 1:
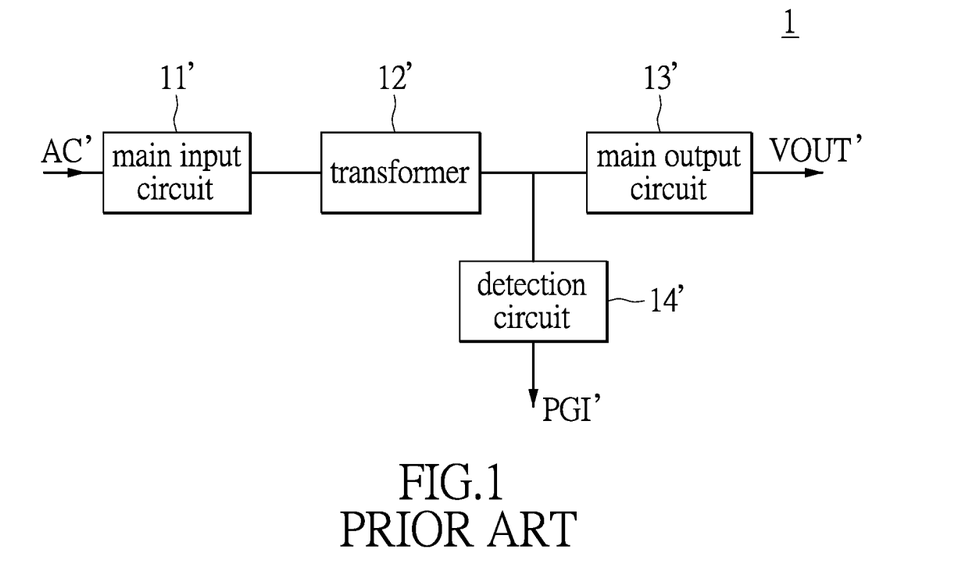
FIG. 1 is a block diagram of a conventional power supply.
Figure 2:
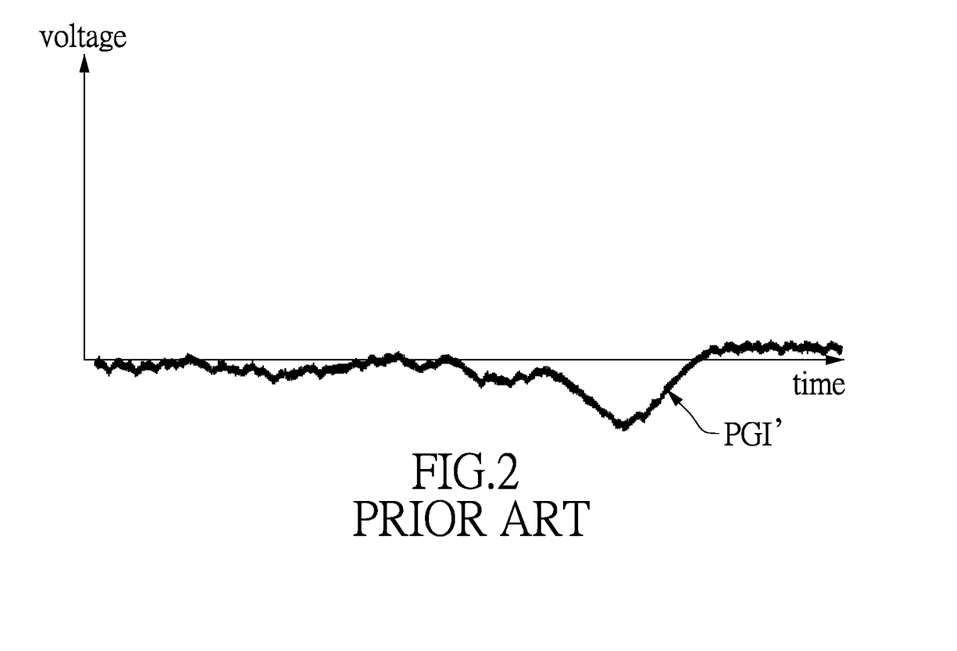
FIG. 2 shows the waveform of a power-good input signal of a conventional power supply.

More particularly, please refer to FIG. 1 and FIG. 2, where FIG. 1 is a block diagram of a conventional power supply and FIG. 2 shows the waveform of a power-good input signal of a conventional power supply. Generally, as shown in FIG. 1, the power supply 1 includes a main input circuit 11', a transformer 12', a main output circuit 13' and a detection circuit 14'. The main input circuit 11' includes an electromagnetic interference (EMI) filter circuit, a rectifier circuit and a power factor correction (PFC) circuit. The main output circuit 13' includes an output filter circuit. The power supply 1 filters out the high-frequency noise in the AC power AC', rectifies the AC power AC' and reduces the harmonic current via the main input circuit 11'. Moreover, the power supply 1 is capable of smoothing output ripples via the main output circuit 13' to provide a load coupled to the power supply 1 with an output voltage VOUT'.

Moreover, the detection circuit 14' is disposed on the secondary side of the transformer 12' to detect the input voltage of the secondary side and to correspondingly generate a power-good input (PGI) signal PGI'. The voltage level of the power-good input signal PGI' indicates whether the power supply 1 is abnormal. Practically, when the power supply 1 is with no load or a very light load, the power consumption on the secondary side is lower than the minimum energy transmitted from the primary side. Meanwhile, the primary side stops transmitting energy for a short time to stabilize the output voltage. However, during the short time the primary side stops transmitting energy, the input voltage on the secondary side falls, which may easily result in malfunction of the computer system due to a correspondingly lowered voltage level of the power-good input signal PGI' as shown in FIG. 2.

To overcome the foregoing problems, it has been reported to add a dummy load on the secondary side or a detection circuit on the primary side. However, the efficiency of the power supply 1 would be lowered so that it fails to meet the efficiency requirement that a power supply is more than 80% efficient at 20% rated load (80PLUS 20%) by Environmental Protection Agency (EPA) if a dummy load is added on the secondary side. Moreover, the manufacturing cost would be higher due to complicated circuitry if a detection circuit is disposed on the primary side.

SUMMARY

The present invention provides an active load circuit capable of being automatically connected to a dummy load to prevent the power supply from being in unstable conditions when there is no load or a very light load.

One embodiment of the present invention provides an active load circuit applicable to a power supply. The power supply includes a transformer, an output terminal and a detection circuit. The detection circuit is coupled to a secondary side of the transformer to detect a voltage on the secondary side and correspondingly generate a power-good input signal. The active load circuit includes a control circuit, a dummy load and an active switching circuit. The control circuit is coupled to the output terminal, the detection circuit and a ground terminal. The dummy load is coupled to the output terminal. The active switching circuit is coupled to the control circuit, the dummy load and the ground terminal. The control circuit receives an output voltage via the output terminal and receives a power-good input signal via the detection circuit. When a voltage level of the power-good input signal is lower than a threshold value, the control circuit controls the active switching circuit to enter a load-on mode so that the dummy load is connected to the ground terminal and the output terminal is connected to the dummy load.

One embodiment of the present invention provides another active load circuit applicable to a power supply. The power supply includes a transformer, an output terminal and a detection circuit. The detection circuit is coupled to a secondary side of the transformer to detect a voltage on the secondary side and correspondingly generate a power-good input signal. The active load circuit includes a control circuit, a dummy load and an active switching circuit. The control circuit is coupled to the output terminal, the detection circuit and a ground terminal. The active switching circuit is coupled to the control circuit and the output terminal. The dummy load is coupled to the control circuit, the active switching circuit and the ground terminal. The control circuit receives an output voltage via the output terminal and receives a power-good input signal via the detection circuit. When a voltage level of the power-good input signal is lower than a threshold value, the control circuit controls the active switching circuit to enter a load-on mode so that output terminal is connected to the dummy load.

In view of the above, the active load circuit according to one embodiment of the present invention controls the output terminal to be connected to or disconnected from the dummy load by detecting a voltage level on the secondary side of the power-good input signal to prevent the power supply from being in an unstable condition when there is no load or a very light load to prevent malfunction of the computer system and to meet the efficiency requirement that a power supply is more than 80% efficient at 20% rated load (80PLUS 20%) by Environmental Protection Agency (EPA).

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

While such terms as "first," "second," "third" etc., may be used to describe various components, such components must not be limited to the above terms. The above terms are used only to distinguish one component from another. For example, a second component may be referred to as a first component within the scope of the present invention, and similarly, the first component may be referred to as the second component. As used herein, the term "and/or" includes any and all combinations of one or more of the associated listed items.

(Embodiment of a Power Supply)

Figure 3:
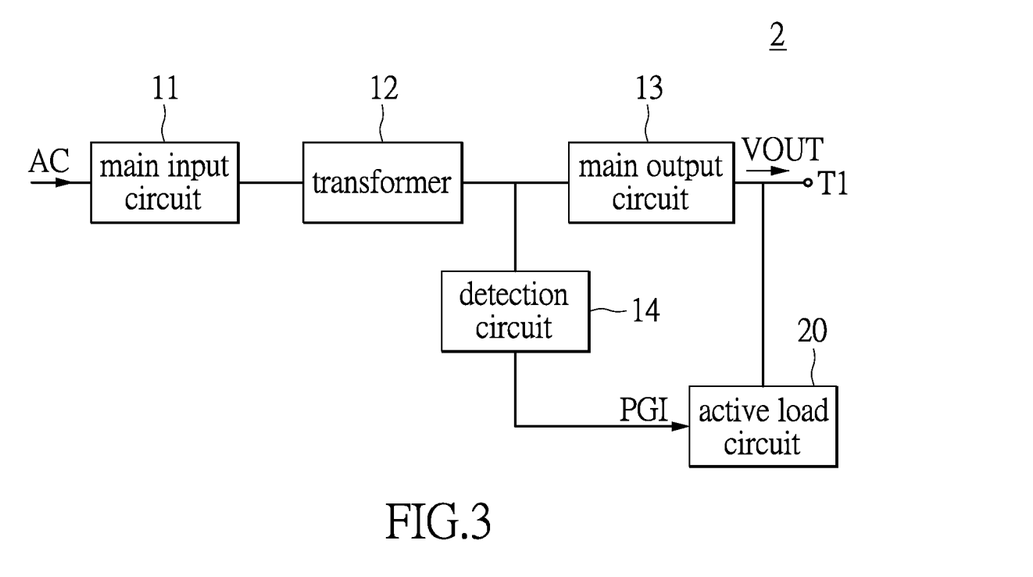
FIG. 3 is a block diagram of a power supply according to one embodiment of the present invention.

With reference to FIG. 3, FIG. 3 is a block diagram of a power supply according to one embodiment of the present invention. As shown in FIG. 3, the power supply 2 includes a main input circuit 11, a transformer 12, a main output circuit 13, a detection circuit 14 and an active load circuit 20. The transformer 12 is coupled to the main input circuit 11, the main output circuit 13 and the detection circuit 14. The active load circuit 20 is coupled to the detection circuit 14 and an output terminal T1 of the power supply 2.

In the present embodiment, the main input circuit 11, including an electromagnetic interference (EMI) filter circuit, a rectifier circuit and a power factor correction (PFC) circuit to filter out the high-frequency noise in an alternate-current power AC, rectifies the alternate-current power AC and reduces the harmonic current. The main output circuit 13 includes an output filter circuit to smooth out the alternate-current power AC. The detection circuit 14 includes a plurality of resistors to detect an input voltage on the secondary side of the transformer 12. However, the present invention is not limited to the previous examples of the main input circuit 11, the main output circuit 13 and the detection circuit 14. A person with ordinary skill in the art may make modifications according to practical demands, as long as the active load circuit 20 receives an output voltage VOUT via the output terminal T1 of the power supply 2 and receives a voltage signal including variation information of the voltage level of the input voltage on the secondary side of the transformer 12 (for example, a power-good input signal PGI provided by the detection circuit 14) via the detection circuit 14. Moreover, it should be noted that the present invention is not limited to that the active load circuit 20 should be disposed in the power supply 2. The active load circuit 20 may also be disposed outside of the power supply 2. The present invention is not limited to the connection between the active load circuit 20 and the power supply 2.

Figure 4:
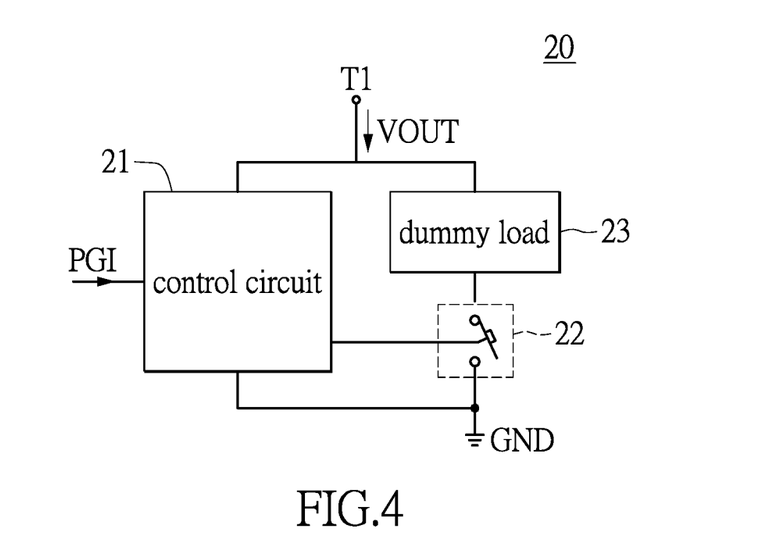
FIG. 4 is a block diagram of an active load circuit according to one embodiment of the present invention.

With reference to FIG. 3 and FIG. 4, FIG. 4 is a block diagram of an active load circuit according to one embodiment of the present invention. As shown in FIG. 4, the active load circuit 20 includes a control circuit 21, an active switching circuit 22 and a dummy load 23. The control circuit 21 is coupled to a ground terminal GND, the output terminal T1, the detection circuit 14 and the active switching circuit 22. The active switching circuit 22 is coupled to the dummy load 23 and the ground terminal GND. The dummy load 23 is coupled to the output terminal T1. The control circuit 21 receives an output voltage VOUT via the output terminal T1 of the power supply 2 and receives a power-good input signal PGI via the detection circuit 14 of the power supply 2.

In the present embodiment, when a voltage level of the power-good input signal PGI is lower than a threshold value (for example, 1.25V), the control circuit 21 controls the active switching circuit 22 to enter a load-on mode so that the dummy load 23 is connected to the ground terminal GND and the output terminal T1 is automatically connected to the dummy load 23. On the other hand, when the voltage level of the power-good input signal PGI is higher than the threshold value (for example, 1.25V), the control circuit 21 controls the active switching circuit 22 to enter a load-off mode so that a connection between the dummy load 23 and the ground terminal 22 is broken and that the output terminal T1 is automatically disconnected from the dummy load 23. As a result, the power supply 2 is automatically connected to the dummy load 23 via the active load circuit 20 to prevent the power supply 2 from being in an unstable condition when there is no load or a very light load. When the power supply 2 is in a condition with a load, the output terminal T1 can also be automatically disconnected from the dummy load 23 so as to meet the efficiency requirement that a power supply is more than 80% efficient at 20% rated load (80PLUS 20%) by Environmental Protection Agency (EPA).

Figure 5:
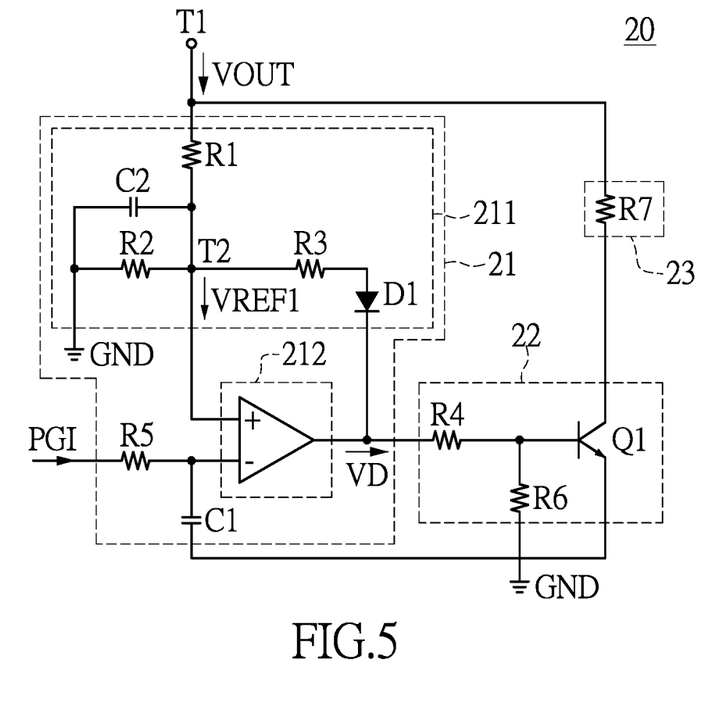
FIG. 5 is a circuit diagram of an active load circuit according to one embodiment of the present invention.

The detail of the active load circuit 20 is described herein. With reference to FIG. 5, FIG. 5 is a circuit diagram of an active load circuit according to one embodiment of the present invention. As shown in FIG. 5, the control circuit 21 includes a setting and hysteresis circuit 211, an input resistor R5, a capacitor C1 and a decision element 212. The active switching circuit 22 includes a resistor R4, a resistor R6 and a switching transistor Q1. The dummy load 23 is, for example, a resistor R7. The switching transistor Q1 is, for example, a bipolar junction transistor (BJT). However, the present invention is not limited thereto.

The setting and hysteresis circuit 211 includes resistors R1~R3, a capacitor C2 and a diode D1. One terminal of the resistor R1 is coupled to the output terminal TI and one terminal of the resistor R7. Another terminal of the resistor R1 is coupled to the resistor R2, the capacitor C2 and one terminal of the resistor R3. The resistor R2 and another terminal of the capacitor C2 are coupled to the ground terminal. Another terminal of the resistor R3 is coupled to an anode of the diode D1. The decision element 212 is a comparator. A positive input terminal of the decision element 212 is coupled to a terminal T2 between the resistor R1 and the resistor R2. A negative input terminal of the decision element 212 is coupled to the input resistor R5 and one terminal of the capacitor C1. The output terminal of the decision element 212 is coupled to one terminal of the resistor R4 and a cathode of the diode D1. Another terminal of the resistor R5 is coupled to the detection circuit 14. A base of the switching transistor Q1 is coupled to another terminal of the resistor R4 and one terminal of the resistor R6. A collector of the switching transistor Q1 is coupled to another terminal of the resistor R7. An emitter of the switching transistor Q1 is coupled to the ground terminal GND, another terminal of the resistor R6 and another terminal of the capacitor C1.

In the present embodiment, the resistor R1 and the resistor R2 form a voltage dividing circuit so as to transmit a reference voltage VREF1 (i.e., the voltage across the resistor R2) via the terminal T2 to the positive input terminal of the decision element 212. The decision element 212 compares the reference voltage VREF 1 with the power-good input signal PGI received by the input resistor R5 to correspondingly generate a decision voltage VD to control the switching transistor Q1 to be turned on or off. As a result, the output terminal Ti is automatically connected to or disconnected from the dummy load 23. Furthermore, when the voltage level of the power-good input signal PGI is lower than the threshold value (for example, 1.25V), the decision element 212 transmits the decision voltage VD with a high voltage level to the active switching circuit 22 to turn on the switching transistor Q1 so that the output terminal T1 is connected to the dummy load 23 (i.e., the active switching circuit 22 enters the load-on mode) after the decision element 212 compares the power-good input signal PGI with the reference voltage VREF 1. On the other hand, when the voltage level of the power-good input signal PGI is higher than the threshold value (for example, 1.25V), the decision element 212 transmits the decision voltage VD with a low voltage level to the active switching circuit 22 to turn off the switching transistor Q1 so that the output terminal T1 is disconnected from the dummy load 23 (i.e., the active switching circuit 22 enters the load-off mode) after the decision element 212 compares the power-good input signal PGI with the reference voltage VREF 1.

It should be noted that, when the decision element 212 transmits the decision voltage VD with a low voltage level to the active switching circuit 22, the diode D1 is turned off; otherwise, when the decision element 212 transmits the decision voltage VD with a high voltage level to the active switching circuit 22, the diode D1 is turned on. Therefore, according to the on/off operation of the diode D1, the voltage level of the reference voltage VREF 1 can be correspondingly changed or maintained to exhibit hysteresis characteristics thereby to prevent the decision element 212 from being easily interfered with by the noise of the power-good input signal PGI and outputting an unexpected decision voltage VD and thus causing malfunction of the switching transistor Q1.

Simply put, the decision element 212 generates the decision voltage VD to turn on or off the switching transistor Q1 according to the reference voltage VREF 1 provided by the setting and hysteresis circuit 211 and the power-good input signal PGI provided by the detection circuit 14 so that the power supply 2 is automatically connected to or disconnected from the dummy load 23.

(Another Embodiment of a Power Supply)

Figure 6:
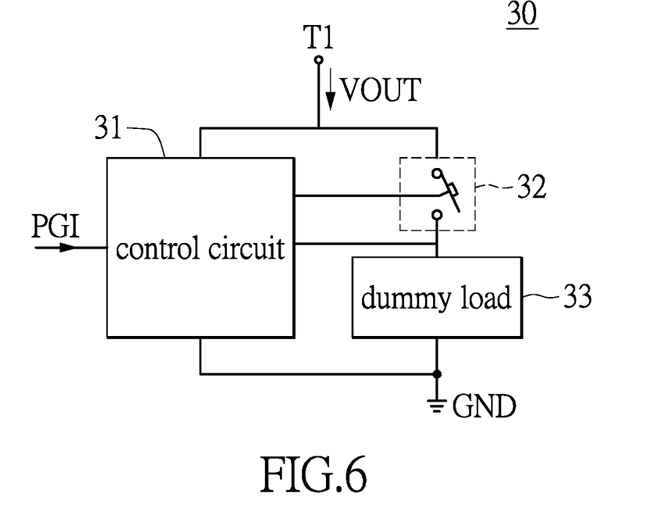
FIG. 6 is a block diagram of an active load circuit according to another embodiment of the present invention.

With reference to FIG. 3 and FIG. 6, FIG. 6 is a block diagram of an active load circuit according to another embodiment of the present invention. As shown in FIG. 6, the active load circuit 30 includes a control circuit 31, an active switching circuit 32 and a dummy load 33. The control circuit 31 is coupled to a ground terminal GND, the output terminal T1, the detection circuit 14, the active switching circuit 32 and the dummy load 33. The active switching circuit 32 is coupled to the dummy load 33 and the output terminal T1. The dummy load 33 is coupled to the ground terminal GND. The control circuit 31 receives an output voltage VOUT via the output terminal T1 of the power supply 2 and receives a power-good input signal PGI via the detection circuit 14 of the power supply 2.

In the present embodiment, when a voltage level of the power-good input signal PGI is lower than a threshold value (which may be different from the previous threshold value (for example, 1.25V)), the control circuit 31 controls the active switching circuit 32 to enter a load-on mode so that output terminal T1 is connected to the dummy load 33. On the other hand, when the voltage level of the power-good input signal PGI is higher than the threshold value, the control circuit 31 controls the active switching circuit 32 to enter a load-off mode so that a connection between the dummy load 33 and the output terminal T1 is broken and that the output terminal T1 is disconnected from the dummy load 33. As a result, the power supply 2 is automatically connected to the dummy load 33 via the active load circuit 30 to prevent the power supply 2 from being in an unstable condition when there is no load or a very light load. When the power supply 2 is in a condition with a load, the output terminal T1 can be automatically disconnected from the dummy load 33 so as to meet the efficiency requirement that a power supply is more than 80% efficient at 20% rated load (80PLUS 20%) by Environmental Protection Agency (EPA).

Figure 7:
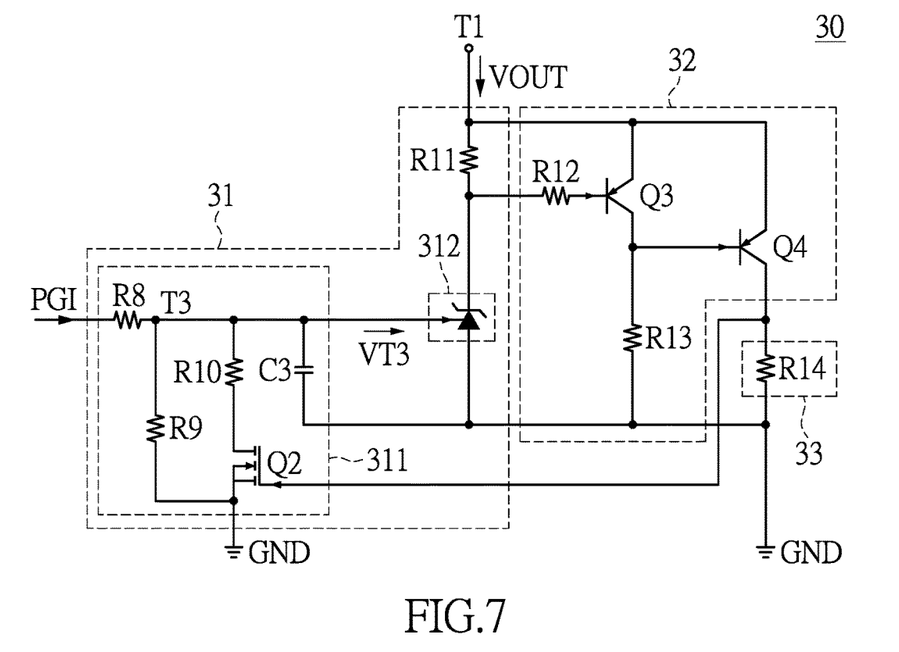
FIG. 7 is a circuit diagram of an active load circuit according to one embodiment of the present invention.

The detail of the active load circuit 30 is described herein. With reference to FIG. 7, FIG. 7 is a circuit diagram of an active load circuit according to one embodiment of the present invention. As shown in FIG. 7, the control circuit 31 includes a setting and hysteresis circuit 311, a resistor R11, and a decision element 312. The active switching circuit 32 includes a resistor R12, a resistor R13, a switching transistor Q3 and a switching transistor Q4. The dummy load 33 is, for example, a resistor R14. The switching transistor Q3 and the switching transistor Q4 are, for example, bipolar junction transistors (BJTs). However, the present invention is not limited thereto.

The setting and hysteresis circuit 311 includes resistors R8~R10, a capacitor C3 and a switching transistor Q2. The switching transistor Q2 is, for example, a metal-oxide-semiconductor field-effect transistor (MOSFET). One terminal of the resistor R8 is coupled to the detection circuit 14. Another terminal of the resistor R8 is coupled to the resistor R9, the resistor R10, and one terminal of the capacitor C3. A source of the switching transistor Q2 is coupled to the ground terminal GND. A drain of the switching transistor Q2 is coupled to another terminal of the resistor R10. A gate of the switching transistor Q2 is coupled to one terminal of the resistor R14. The decision element 312 is a three-terminal shunt regulator. The input terminal of the decision element 312 is coupled to another terminal of the capacitor C3. A cathode of the decision element 312 is coupled to the resistor R11 and one terminal of the resistor R12. An anode of the decision element 312 is coupled to the ground terminal GND, another terminal of the resistor R14 and one terminal of the resistor R13. Another terminal of the resistor R11 is coupled to the output terminal T1. A base of the switching transistor Q3 is coupled to another terminal of the resistor R12. An emitter of the switching transistor Q3 is coupled to the output terminal T1. A collector of the switching transistor Q3 is coupled to another terminal of the resistor R13. A base of the switching transistor Q4 is coupled to a collector of the switching transistor Q3. An emitter of the switching transistor Q4 is coupled to the output terminal T1. A collector of the switching transistor Q4 is coupled to a gate of the switching transistor Q2.

In the present embodiment, the decision element 312 has a built-in reference voltage (for example, 1.25V) and acquires a decision voltage VT3 via a terminal T3 between the resistor R8 and the resistor R9. When the voltage level of the decision voltage VT3 is lower than the built-in reference voltage of the decision element 312 (for example, 1.25V), the decision element 312 is turned off so that the switching transistor Q3 is turned off and the switching transistor Q4 is turned on. As a result, the output terminal T1 is automatically connected to the dummy load 33 (i.e., the active switching circuit 32 enters the load-on mode). On the other hand, when the decision voltage VT3 is higher than the built-in reference voltage of the decision element 312 (for example, 1.25V), the decision element 312 is turned on so that switching transistor Q3 is turned on and the switching transistor Q4 is turned off. As a result, the output terminal T1 is automatically disconnected from the dummy load 33 (i.e., the active switching circuit 32 enters the load-off mode).

It should be noted that, when the switching transistor Q4 is turned on, the switching transistor Q2 is turned on so that the resistor R10 is coupled to the ground terminal. Therefore, the resistor R9 and the resistor R10 are connected in parallel. When the switching transistor Q4 is turned off, the switching transistor Q2 is turned off so that an open circuit is formed between the resistor R10 and the ground terminal. Therefore, the resistor R9 and the resistor R10 are not connected in parallel. As a result, according to the on/off operation of the switching transistor Q2, the voltage level of the voltage VT3 can be correspondingly changed to exhibit hysteresis characteristics thereby to prevent the decision element 312 from being easily interfered with by the noise of the power-good input signal PGI and being easily turned on or off and causing malfunction of the active switching circuit 32.

In view of the above, since the decision voltage VT3 is a divided voltage of the power-good input signal PGI across the resistors R8~R10 or the resistors R8~R9, when the decision voltage VT3 is higher than the built-in reference voltage of the decision element 312, it indicates that the power-good input signal PGI is higher than the threshold value so that the power supply 2 is disconnected from the dummy load 33. When the decision voltage VT3 is lower than the built-in reference voltage of the decision element 312, it indicates that the power-good input signal PGI is lower than the threshold value so that the power supply 2 is connected to the dummy load 33. Simply put, the decision element 312 turns the switching transistor Q3 and the switching transistor Q4 on or off according to whether the decision voltage VT3 provided by the setting and hysteresis circuit 311 is higher than the built-in reference voltage so that the power supply 2 is automatically connected to or disconnected from the dummy load 33.

In the present invention, the active load circuit 20 or the active load circuit 30 controls the output terminal T1 of the power supply 2 to be automatically connected to a dummy load when the voltage level of the power-good input signal PGI is lower than a threshold value so as to prevent the power supply 2 from being in an unstable condition when there is no load or a very light load.

Figure 8:
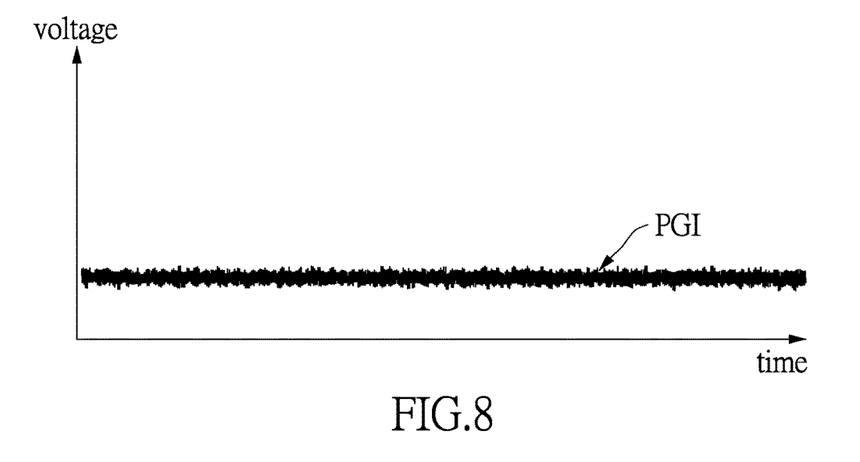
FIG. 8 shows the waveform of a power-good input signal of a power supply according to one embodiment of the present invention.

With reference to FIG. 8, FIG. 8 shows the waveform of a power-good input signal of a power supply according to one embodiment of the present invention. As shown in FIG. 8, by connecting the active load circuit 20 or the active load circuit 30 to the output terminal T1 of the power supply 2 and the detection circuit 14 on the secondary side of the transformer 12, the voltage level of the power-good input signal PGI can be stably maintained to prevent the computer system with the power supply 2 from being unstable causing malfunction due to the instability of the power supply 2.

(Functions of the Embodiments)

Accordingly, the active load circuit according to one embodiment of the present invention controls the output terminal to be connected to or disconnected from the dummy load by detecting a voltage level on the secondary side of the power-good input signal to prevent the power supply from being in an unstable condition when there is no load or a very light load, to prevent malfunction of the computer system and meet the efficiency requirement that a power supply is more than 80% efficient at 20% rated load (80PLUS 20%) by Environmental Protection Agency (EPA).

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An active load circuit applicable to a power supply, said power supply comprising a transformer, an output terminal and a detection circuit, said detection circuit being coupled to a secondary side of said transformer to detect a voltage on said secondary side and correspondingly generate a power-good input signal, said active load circuit comprising:
    a control circuit, coupled to said output terminal, said detection circuit and a ground terminal, said control circuit receiving an output voltage and said power-good input signal via said output terminal and said detection circuit;
    a dummy load, coupled to said output terminal; and
    an active switching circuit, coupled to said control circuit, said dummy load and said ground terminal;
    wherein, when a voltage level of said power-good input signal is lower than a threshold value, said control circuit controls said active switching circuit to enter a load-on mode so that said dummy load is connected to said ground terminal and that said output terminal is connected to said dummy load.

2. The active load circuit of claim 1, wherein, when said voltage level of said power-good input signal is higher than said threshold value, said control circuit controls said active switching circuit to enter a load-off mode so that a connection between said dummy load and said ground terminal is broken and that said output terminal is disconnected from said dummy load.

3. The active load circuit of claim 1, wherein said control circuit comprises:
    a setting and hysteresis circuit, coupled to said output terminal and said ground terminal, said setting and hysteresis circuit generating a reference voltage according to said output voltage;
    an input resistor, one terminal of said input resistor being coupled to said detection circuit;

a first capacitor, one terminal of said first capacitor being coupled to another terminal of said input resistor and another terminal of said first capacitor being coupled to said ground terminal; and a decision element, coupled to said active switching circuit, said setting and hysteresis circuit and said input resistor, said decision element controlling said active switching circuit to enter said load-on mode or said load-off mode according to said reference voltage and said power-good input signal.

4. The active load circuit of claim 3, wherein said setting and hysteresis circuit comprises:

a first resistor, one terminal of said first resistor being coupled to said output terminal;

a second resistor, one terminal of said second resistor being coupled to another terminal of said first resistor and another terminal of said second resistor being coupled to said ground terminal;

a second capacitor, connected with said second resistor in parallel;

a third resistor, one terminal of said third resistor being coupled to one terminal of said second resistor; and a first diode, an anode of said first diode being coupled to another terminal of said third resistor, a cathode of said first diode being coupled to said decision element and said active switching circuit.

5. The active load circuit of claim 3, wherein said decision element is a comparator and comprises a positive input terminal, a negative input terminal and an output terminal, said positive input terminal being coupled to said setting and hysteresis circuit, said negative input terminal being coupled to another terminal of said input resistor, and said output terminal being coupled to said active switching circuit to output a decision voltage to control said active switching circuit to enter said load-on mode or said load-off mode.

6. The active load circuit of claim 4, wherein said decision element is a comparator and comprises:

a positive input terminal, coupled to another terminal of said first resistor to receive said reference voltage;

a negative input terminal, coupled to another terminal of said input resistor to receive said power-good input signal; and an output terminal, coupled to said cathode of first diode and said active switching circuit to output a decision voltage to said active switching circuit so that said active switching circuit enters said load-on mode or said load-off mode.

7. The active load circuit of claim 4, wherein, when said active switching circuit enters said load-off mode, said first diode is off.

8. The active load circuit of claim 6, wherein, when said active switching circuit enters said load-off mode, said first diode is off.

9. The active load circuit of claim 1, wherein said active switching circuit comprises:

a fourth resistor, one terminal of said fourth resistor being coupled to said control circuit;

a fifth resistor, one terminal of said fifth resistor being coupled to another terminal of said fourth resistor and another terminal of said fifth resistor being coupled to said ground terminal; and a switching transistor, a base of said switching transistor being coupled to another terminal of said fourth resistor, a collector of said switching transistor being coupled to said dummy load, and an emitter of said switching transistor being coupled to said ground terminal;

wherein, when said switching transistor is turned on, said active switching circuit enters said load-on mode and, when said switching transistor is turned off, said active switching circuit enters said load-off mode.

10. An active load circuit applicable to a power supply, said power supply comprising a transformer, an output terminal and a detection circuit, said detection circuit being coupled to a secondary side of said transformer to detect a voltage on said secondary side and correspondingly generate a power-good input signal, said active load circuit comprising:

a control circuit, coupled to said output terminal, said detection circuit and a ground terminal, said control circuit receiving an output voltage and said power-good input signal via said output terminal and said detection circuit;

an active switching circuit, coupled to said control circuit and said output terminal; and a dummy load, coupled to said control circuit, said active switching circuit and said ground terminal;

wherein, when a voltage level of said power-good input signal is lower than a threshold value, said control circuit controls said active switching circuit to enter a load-on mode so that said output terminal is connected to said dummy load.

11. The active load circuit of claim 10, wherein, when said voltage level of said power-good input signal is higher than said threshold value, said control circuit controls said active switching circuit to enter a load-off mode so that said output terminal is disconnected from said dummy load.

12. The active load circuit of claim 10, wherein said control circuit comprises:

a setting and hysteresis circuit, coupled to said detection circuit and said ground terminal, said setting and hysteresis circuit generating a decision voltage according to said power-good input signal;

a first resistor, one terminal of said first resistor being coupled to said output terminal, another terminal of said first resistor being coupled to said active switching circuit; and a decision element, coupled to said active switching circuit, said ground terminal, said setting and hysteresis circuit and another terminal of said first resistor, said decision element controlling said active switching circuit to enter said load-on mode or said load-off mode according to a reference voltage and said decision voltage.

13. The active load circuit of claim 12, wherein said setting and hysteresis circuit comprises:

a second resistor, one terminal of said second resistor being coupled to said detection circuit;

a third resistor, one terminal of said third resistor being coupled to another terminal of said second resistor, another terminal of said third resistor being coupled to said ground terminal;

a fourth resistor, one terminal of said fourth resistor being coupled to another terminal of said second resistor;

a first switching transistor, a source of said first switching transistor being coupled to said ground terminal, a drain of said first switching transistor being coupled to another terminal of said fourth resistor, a gate of said first switching transistor being coupled between said active switching circuit and said dummy load; and a first capacitor, one terminal of said first capacitor being coupled to another terminal of said second resistor, another terminal of said first capacitor being coupled to said ground terminal.

14. The active load circuit of claim 12, wherein said decision element is a three-terminal shunt regulator, said decision element comprising an input terminal, a cathode and an anode, said input terminal being coupled to said setting and hysteresis circuit, said cathode being coupled to said first resistor, and said anode being coupled to said ground terminal.

15. The active load circuit of claim 13, wherein said active switching circuit comprises:
   a fifth resistor, one terminal of said fifth resistor being coupled to said control circuit;
   a second switching transistor, a base of said second switching transistor being coupled to another terminal of said fifth resistor, an emitter of said second switching transistor being coupled to said output terminal;
   a third switching transistor, a base of said third switching transistor being coupled to a collector of said second switching transistor, an emitter of said third switching transistor being coupled to said output terminal, and a collector of said third switching transistor being coupled to said dummy load; and
   a sixth resistor, one terminal of said sixth resistor being coupled to a collector of said third switching transistor, and another terminal of said sixth resistor being coupled to said ground terminal.

16. The active load circuit of claim 15, wherein one terminal of said fifth resistor is coupled to said cathode of said decision element, said sixth resistor is coupled to said anode of said decision element and, said second switching transistor is turned off and said third switching transistor is turned on so that said output terminal is connected to said dummy load when said decision element is turned off and said second switching transistor is turned on and said third switching transistor is turned off so that said output terminal is disconnected from is disconnected from said dummy load when said decision element is turned on.

17. The active load circuit of claim 15, wherein a collector of said third switching transistor is coupled to a gate of said first switching transistor, said first switching transistor is turned off when said third switching transistor is turned off and, said first switching transistor is turned on when said third switching transistor is turned on.

\* \* \* \* \*